(12) United States Patent
Ramaswamy et al.

(10) Patent No.: US 8,676,972 B2
(45) Date of Patent: Mar. 18, 2014

(54) METHOD AND SYSTEM FOR A NETWORK MANAGEMENT CONSOLE

(75) Inventors: Arvind Ramaswamy, Ottawa (CA); David Schenkel, Ottawa (CA); Michael Slavitch, Ottawa (CA)

(73) Assignee: Hewlett-Packard Development Company, L.P., Houston, TX (US)

(*) Notice: Subject to any disclaimer, the term of this patent is extended or adjusted under 35 U.S.C. 154(b) by 2643 days.

(21) Appl. No.: 10/506,815

(22) PCT Filed: Mar. 6, 2003

(86) PCT No.: PCT/CA03/00307
§ 371 (c)(1),
(2), (4) Date: Apr. 11, 2005

(87) PCT Pub. No.: WO03/075531
PCT Pub. Date: Sep. 12, 2003

(65) Prior Publication Data
US 2005/0198323 A1 Sep. 8, 2005

Related U.S. Application Data

(60) Provisional application No. 60/361,709, filed on Mar. 6, 2002.

(51) Int. Cl.
*G06F 15/173* (2006.01)
*G06F 15/16* (2006.01)

(52) U.S. Cl.
USPC .......................................... 709/225; 709/229

(58) Field of Classification Search
USPC .................................. 709/223, 224, 225, 229
See application file for complete search history.

(56) References Cited

U.S. PATENT DOCUMENTS 5,627,967 A * 5/1997 Dauerer et al. ................... 726/2
5,826,014 A   10/1998 Coley et al.
(Continued)

FOREIGN PATENT DOCUMENTS

| EP | 0 580 350 | 1/1994 |
| WO | WO 98 27502 | 6/1998 |
| WO | WO 02 14987 | 2/2002 |

OTHER PUBLICATIONS

A Reference Model for Firewall Technology, Christopher L. Schuba et al., COAST Laboratory, Department of Computer Sciences, West Lafayett, Indiana, U.S.A., 1997 IEEE.

*Primary Examiner* — Derrick Ferris
*Assistant Examiner* — Farhad Ali

(57) ABSTRACT

A method and a system for identifying unauthorized accesses to a data network service by a particular node in a data network is disclosed. The NMC communicates with an agent periodically to gather a list of users of the service node. An agent is installed on the service node to monitor all network accesses to the service. By configuring the agent to monitor all access to the service node, through SNMP or a similar protocol, the agent maintains a list of all accesses to that service node. This list is stored internally by the agent and queried for by the NMC periodically. The access information stored by the agent is periodically retrieved by the NMC for all monitored nodes and compared with the authorization list for the node. If unauthorized accesses are found, they are identified by the NMC. These unauthorized accesses can be notified to the appropriate entity in a number of ways such as through paging, email or a report viewable through the NMC.

20 Claims, 4 Drawing Sheets

(56) References Cited

U.S. PATENT DOCUMENTS

| | | | |
|---|---|---|---|
| 6,122,740 A * | 9/2000 | Andersen | 726/4 |
| 6,240,091 B1 * | 5/2001 | Ginzboorg et al. | 370/401 |
| 6,411,997 B1 | 6/2002 | Dawes et al. | |
| 6,424,929 B1 | 7/2002 | Dawes | |
| 6,463,474 B1 * | 10/2002 | Fuh et al. | 709/225 |
| 6,519,639 B1 | 2/2003 | Glasser et al. | |
| 6,519,703 B1 | 2/2003 | Joyce | |
| 6,539,540 B1 * | 3/2003 | Noy et al. | 717/141 |
| 2002/0129355 A1 | 9/2002 | Veltin et al. | |
| 2002/0194584 A1 | 12/2002 | Suorsa et al. | |
| 2003/0009552 A1 | 1/2003 | Benfield et al. | |
| 2003/0014518 A1 | 1/2003 | Richard | |
| 2003/0033404 A1 | 2/2003 | Richardson | |

* cited by examiner

METHOD AND SYSTEM FOR A NETWORK MANAGEMENT CONSOLE

RELATED APPLICATIONS

This application claims the benefit of U.S. provisional application No. 60/361,709, filed Mar. 6, 2002.

BACKGROUND OF THE INVENTION

1. Field of the Invention

The present invention relates to a method and a system for identifying and notifying unauthorized access to data network services.

2. Description of the Prior Art

A data communications network is increasingly becoming an essential component of every organization. This component is often critical enough to require constant monitoring to ensure proper performance and authorized accesses. Various data network management tools exist for this purpose. The management tools interrogate data network devices to gather information about the device and its environment. At present, the most pervasive tool is the Simple Network Management Protocol (SNMP)—a standard implemented in network nodes to publish information for the purposes of data network management.

The model assumed by SNMP is a central management station and a number of data collection points, known to the skilled artisan as software agents, or simply as agents. The agents are instructed by the management station as to what information to collect. The management stations then collect this information from the agents through SNMP. The data and functions that the agent supports are specified in a well known data structure called a Management Information Base (MIB). The MIB specifies which variables the management station contains, such as the information that can be queried and set by the management station.

This queried information often includes information that is sensitive to the organization and should be directed only through a Network Management Console (NMC)—a device which manages the data network. Given the increasing security consciousness of organizations these days, there is sometimes reluctance on the part of the Network Operations Console (NOC), also referred to as the network administrators, to enable the SNMP service on the data network.

Although there is an authentication system built into the SNMP protocol to prevent unauthorized accesses, it is rendered useless if the authentication passwords have been compromised. If the SNMP service has been enabled at various nodes in the data network for the sole purpose of communicating with an NMC for data network management, the NOC may want to be aware of "out-of-the-ordinary" accesses of service nodes in the data network. Such "out-of-the-ordinary" accesses might be indicative of possible security breaches by any unauthorized users within the data network. This assumes added significance in the light of the CERT® (Computer Emergency Response Team) Advisory on SNMP, issued Feb. 12, 2002 by the CERT® Coordination Center, which has caused increased scrutiny in the use of SNMP within a data network.

One solution to prevent unauthorized accesses is the use of a firewall. Essentially, a conventional firewall is a data network node having the capability of blocking off access from a node, or a plurality of nodes, within the data network to a service, or a plurality of services, provided by another node, or a plurality of nodes, within the data network. The main purpose of a firewall is to protect a networked entity, i.e., a corporation's intranet, from unauthorized accesses while permitting authorized accesses. In essence, the firewall separates an interconnected data network into a "trusted network" and an "untrusted network". Specifically, the firewall is concerned with the data interaction between the two data networks.

Although it is theoretically possible to construct a data network such that there is a firewall between every trusted group of computers, it is not the general practice. Rather, a single firewall typically exists within any given intranet. Even in situations where such a data network exists, there may still be accesses within a "trusted" network that are unauthorized and require attention. For example, within a Human Resources (HR) department, there could be a new recruit or a co-op student who may have access to all the machines within the department. Meanwhile, the person is only authorized to access certain machines from their node in the data network. A firewall would not detect such accesses. While a firewall could be suitably placed to achieve the same result, such an implementation would be costly as further hardware is required. Furthermore, an implementation where a separate firewall is utilized every 3 to 4 network devices throughout the corporate data network, or intranet, is not practical for most organizations.

In the prior art, the published international patent application, WO 98/27502, by Anderson of Intel Corporation, discloses a method and an apparatus for remote network access logging and reporting that intercepts an access request made by a client system in a network. According to the Intel publication, the intercepted access request is identified and sent to a centralized log server in the network. In response, the centralized log server sends an access list to the client system to compare the access request to the access list. If the access request does not conflict with the access list then client system is granted access to a host system. However, this prior art system requires the provision of a centralized log server and the installation a logging dynamic link library (DLL) at each client system in the network. The logging DLL is a specialized logging mechanism which requires specific intelligence to intercept logging requests and which invariably delays access requests made by client systems to host systems. The installation of the logging DLL at each client system and the requirement for a centralized logging server as part of the network adds a level of complexity and cost in deploying such a system. Moreover, given that the intelligence of the logging DLL is specialized, its functionality is not pre-existing at the client system. Thus, to support the Intel system, the logging DLL must be installed at each client system. There is a need therefore in the art to provide a network management tool that takes advantage of pre-existing network capabilities and intelligence at each node in a network to identify unauthorized accesses. The installation of a centralized logging server and a logging DLL at each client system in the network, as taught by the Intel publication, does not fulfill this need.

In view of the above-noted shortcomings, the present invention seeks to provide a system and a method identifying unauthorized accesses to a data network service by a user node in the data network. The present invention further seeks to provide a system and a method embodied in an NMC or a similar data network management system.

SUMMARY OF THE INVENTION

The present invention provides both a method and a system for identifying unauthorized accesses to a data network service by a particular node in a data network. According to the present invention, the NMC communicates with an agent periodically to gather a list of users of the service node. An agent is installed on the service node to monitor all network accesses to the service. By configuring the agent to monitor all accesses to the service node, through SNMP or a similar protocol, the agent maintains a list of all accesses to that service node. This list is stored internally by the agent and queried for by the NMC periodically. The access information stored by the agent is periodically retrieved by the NMC for all monitored nodes and compared with the authorization list for the node. If unauthorized accesses are found, they are identified by the NMC. These unauthorized accesses can be notified to the appropriate entity in a number of ways such as through paging, email, a report viewable through the NMC, or any suitable manner of notification.

The present invention is advantageous in that it is cost-effective and provides a software-only solution with centralized control for network-wide monitoring.

In a first aspect, the present invention provides a data network management system for identifying unauthorized access to a data network service, provided at a service node in a data network, by a user node in said data network, said service node having an agent and having means for maintaining a user access list, said user access list having at least one data network address corresponding to at least one user node in said data network, said system comprising: a data communication means for periodically polling said agent at said service node and for retrieving a user access list from said agent; a database for maintaining an authorized access list for said service node; and a data processing means for comparing said user access list to said authorized user access list and for updating said authorized user access list, said authorized user access list being maintained in said database, an updated authorized user access list based on an updated user access list for said agent.

In a second aspect, the present invention provides a method for identifying unauthorized access to a data network service, provided at a service node in a data network, by a user node in said data network, said service node having an agent and having means for maintaining a user access list, said user access list having at least one data network address corresponding to at least one user node in said data network, said steps comprising: a) periodically polling an agent and retrieving said user access list, for a given period of time, from said service node in said data network; b) comparing said user access list to an authorized access list; c) determining if said unauthorized access occurred based on said comparison step b); d) if determined that said unauthorized access occurred in step c), initiating a notification process.

In a third aspect, the present invention provides a computer-readable medium for identifying unauthorized access to a data network service, provided at a service node in a data network, by a user node in said data network, said service node having an agent and having means for maintaining a user access list, said user access list having at least one data network address corresponding to at least one user node in said data network, and said medium having stored thereon, computer-readable and computer-executable instructions which, when executed by a processor, cause said processor to perform steps comprising: a) periodically polling an agent and retrieving said user access list, for a given period of time, from said service node in a data network; b) comparing said user access list to an authorized access list; c) determining if said unauthorized access occurred based on said comparison step b); d) if determined that said unauthorized access occurred in step c), initiating a notification process.

In a fourth aspect, the present invention provides in computer for use in a data network for identifying unauthorized access to a data network service, provided at a service node in a data network, by a user node in said data network, said service node having an agent and having means for maintaining a user access list, said user access list having at least one data network address corresponding to at least one user node in said data network, said computer comprising: a storage means; a central processing unit; a data communication means for periodically polling said agent at said service node and retrieving a user access list from said agent; said storage means having a database for maintaining an authorized access list for said service node; and a data processing means for comparing said user access list to said authorized user access list and for updating said authorized user access list, said authorized user access list being maintained in said database, an updated authorized user access list based on an updated user access list for said agent.

DETAILED DESCRIPTION OF THE INVENTION

The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
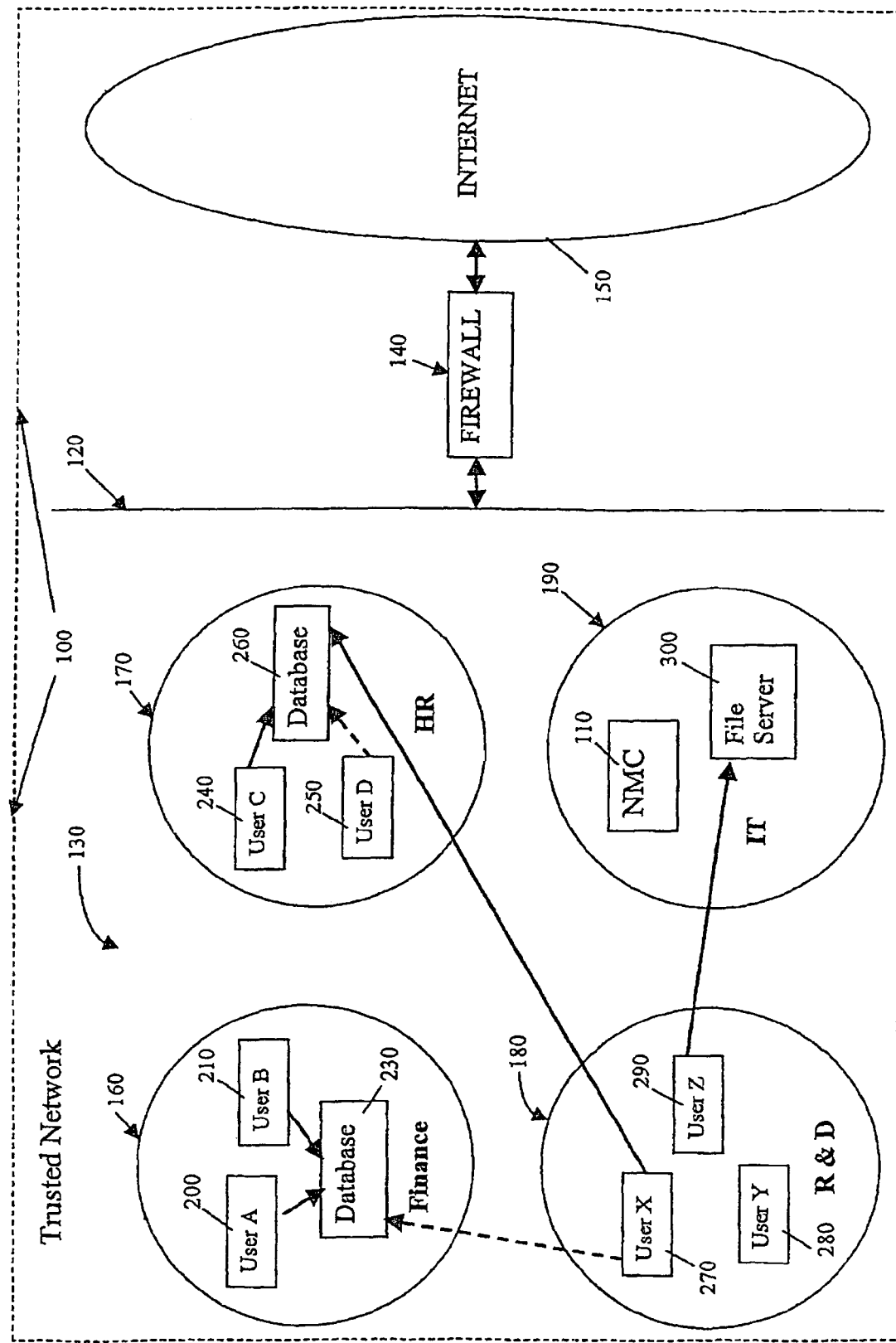
FIG. 1 is a block diagram of a data network having a network management system embodying the present invention.

FIG. 1 is a block diagram of a data network 100 having a network management system 110, hereinafter referred to as the NMC, in accordance with the present invention. For illustrative purposes, a line 120 divides the data network 100. On the left hand side, a "trusted" network 130 is shown within the data network 100. The "trusted' network 130 is defined as any organization or data network of nodes within which there is no firewall. To the right of the line 120 is a conventional firewall 140. In FIG. 1, the firewall 140 protects the "trusted" network 130 from the Internet 150.

A network management system, such as NMC 110, discovers devices and their attributes in a network. Apart from an Internet Protocol (IP) address, devices may have Media Access Control (MAC) addresses, unique and local Domain Name Server (DNS) names, SNMP system names, WINDOWS™ operating system names and several other discriminators. A user at a node within any given network can select a device uniquely using one of a choice of metrics. Based on those discoveries, the network management system determines the physical topology of the network.

It should be mentioned that the number of possible discriminators is unbounded and changing. New metrics, such as Voice over IP telephone number, are appearing as new protocols appear and existing ones are modified. As such, the present invention is not limited to such metrics which are known at the present time.

In FIG. 1, the "trusted" data network 130 is an example of the data network arrangement of a corporation's intranet communicating through use of SNMP. There are four different services, or departments, Finance 160, Human Resources (HR) 170, Research and Development (R&D) 180, Information Technology (IT) 190. Each of the four different departments 160, 170, 180, 190, consist of either users, a database, servers, or the like. The Finance department 160 consists of User A 200, User B 210, as well as a Finance database 230. The HR department 170 consists of User C 240, User D 250, and an HR database 260. The R&D Department 180 consists of User X 270, User Y 280, and User Z 290. Finally, the IT department 190 consists of the NMC 110 and a file server 300. For clarity sake, each user 200, 210, 240, 250, 270, 280, each database 230, 260, the file server 300, and the NMC 110 are independently located at nodes having corresponding network addresses within the "trusted" data network 130.

It is assumed that each database 230, 260, as well as the file server 300 contains data related to their corresponding department. Depending on the department, the data contained in each database may be deemed accessible to only certain users. It is further assumed that each database 230, 260, as well as the file server 300 includes an agent capable of communicating information about its node to the NMC 110 node.

While the present invention includes an NMC 110, the use of software agents is an integral part of the present invention. The agent maintains a list of all accesses to network services on that node. The agent monitors network accesses to and from the node and maintains a list of accesses internally. Although we presently make use of an agent that provides this information through an SNMP MIB, it is possible to utilize any other suitable software module providing similar information through a different communication method. For the purposes of FIG. 1, it is assumed that the each database 230, 260, as well as the file server 300, include an SNMP agent.

Prior to operation, the NMC 110 is configured with a list of authorized users for each service node. In FIG. 1, the service nodes are both databases 230, 260, as well as the file server 300. In some cases, a common authorization list exists for a group of user nodes, this configuration is simplified by having the NMC 110 accept a range of user nodes for a given authorization list. For example, the users in the Finance Department 160 are listed in the authorization list associated with the Finance database 230.

Further in FIG. 1, the solid, linear lines illustrate an authorized access between any one of the users 200, 210, 240, 250, 270, 280, the databases 230, 260, or the file server 300. By comparison, the dashed, linear lines illustrate an unauthorized access between any one of the users 200, 210, 240, 250, 270, 280 and the databases 230, 260. For example, User X 270 has authorized access to the HR database 260 but unauthorized access to the Finance Database 230. According to the present invention, both the Finance database 230 and the HR database 260 each have agents which will maintain a service access list. As User X 270 has accessed both databases, each of their agents will have stored the network address assigned to User X 270 in their service access list.

In operation, the NMC 110 communicates with the various nodes in the "trusted" data network, through their agents. The NMC 110, as part of its regular operation, periodically polls each of the nodes it has discovered to retrieve information. If the node has a suitable agent installed, in addition to the regular queries it also retrieves service access information. The service access information is validated with an authorized service list for that service node. If unauthorized users are identified, they may be stored in the NMC's database (not shown) for notification.

According to the example in FIG. 1, the NMC 110 would have retrieved the service access list from the Finance database 230 through its database agent. The service access list would have listed User X 270, among others, such as User A 200 and User B 210, as having accessed the Finance database 230. After retrieving service access list, the NMC 110 retrieves an authorized access list associated with the Finance database 230, from the NMC database (not shown). By comparing the lists, the NMC 110 determines that User X 270 is not a listed authorized user on the authorized service list for the Finance database 230. It follows that User X 270 would have been identified by the NMC 110 as an unauthorized user of the Finance database 230.

According to the present invention, the NMC 110 continues to retrieve service access lists for service nodes not previously polled in the network, as well as periodically poll service nodes already polled. In a previous step, the NMC 110 would have also identified the HR database 260 as a service node. As with the Finance database 230, the NMC 110 would retrieve the service access list from the HR database 260 through its database agent. Again, by comparing the lists, the NMC 110 would have identified User X 270 as an authorized user of the HR database 260.

As is common general knowledge to the skilled artisan in the field of data networking, polling for the purposes of the present invention is defined as a process of collecting call and network event records by periodically interrogating peripheral devices, remote stations, or nodes in a data network, one at a time, and requesting data transmission.

For every node with unauthorized users recorded in the NMC database, a notification configuration is checked to determine the appropriate notification mechanism. For example, nodes with a high enough priority may require a page sent out whereas nodes, such as workstations, that are considered less significant may require an email notification to the department administrator. In addition to these asynchronous notifications, these access violations are also stored in a report maintained by the NMC 110.

Figure 2:
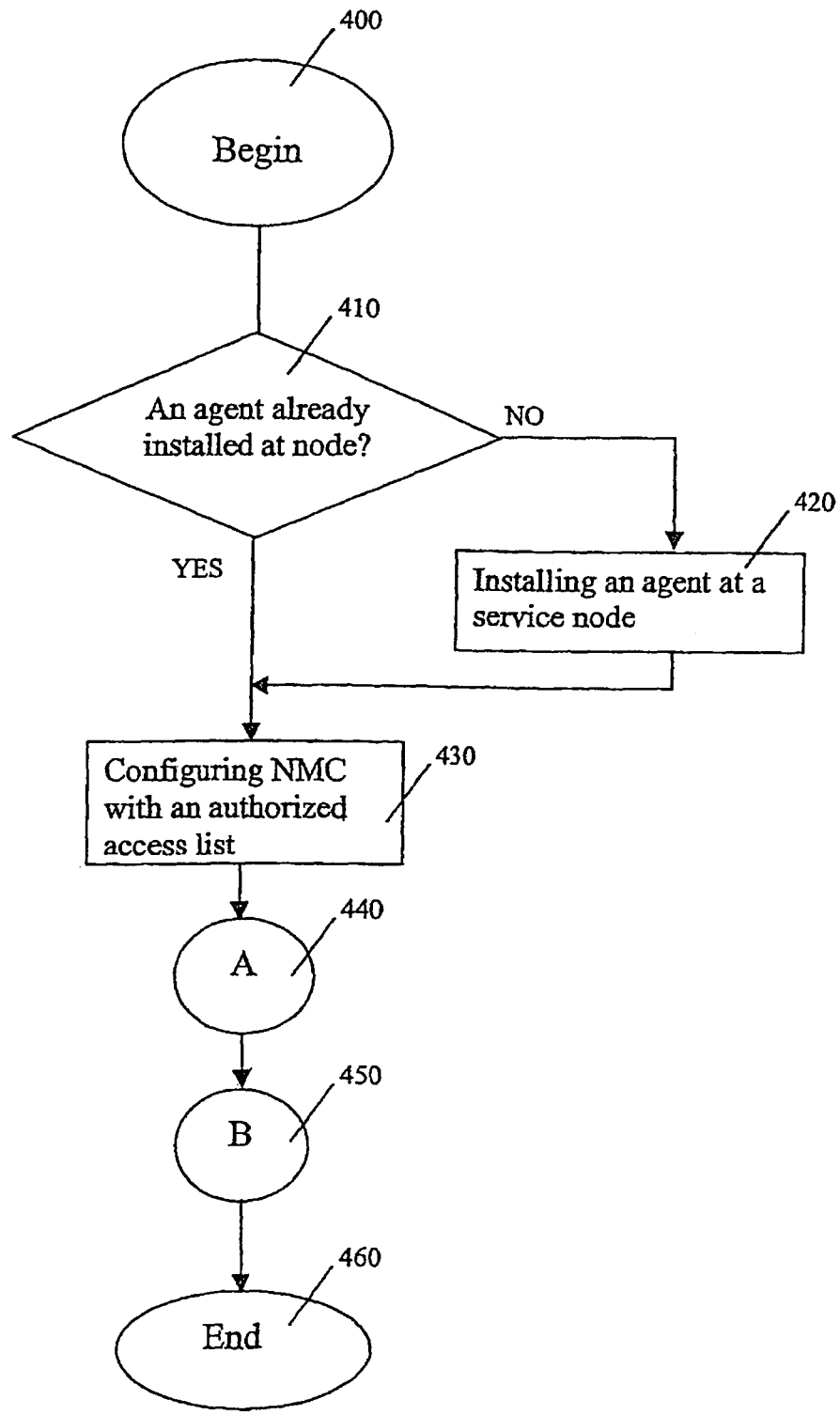
FIG. 2 is a flowchart detailing the steps for configuring the network management system in accordance with the present invention.

Referring now to FIG. 2, a flowchart details the steps in configuring the network management system in accordance with the present invention. In step 400, the NMC begins the process of discovering the network by identifying all service nodes. At each service node, step 410 determines if a suitable agent is already installed at the service node. If a suitable agent is installed, then step 430 is executed. If a suitable agent is not already installed, then in step 420 the NMC 110 installs a suitable agent at that node. Essentially, a software module is sent to the service node from the NMC 110. It should be mentioned that the step 420 of installing may be done manually prior to, or after, commencing this process. The agent is enabled to monitor user accesses to the service node and store the access information internally. The agent may also be configured, by the NMC 110, to discard stored access information after expiry time. Upon completing step 420, the NMC 110 is configured with an authorized access list for the service node if not in existence. An authorized access list may already be present for the service node if there exists an authorized access list in the NMC 110 that is associated with a range of IP addresses and the service node is within the address range. The NMC authorized access list may include specifying an IP range of discovered nodes. Accordingly, the IP address range would be defined to include the whole network and include the NMC's IP address in its authorized users access list. In step 420, the configuration step also includes setting the polling frequency. The agent must be polled periodically such that the frequency is sufficient to collect all the access information stored by the agent prior to the expiry time of that information. Following step 430, the process then uses connector A 440 to step 440 in FIG. 3. However in the process of FIG. 2, connector B 450 follows from connector A 440. The connector B 450 is used to automatically end the process at step 460.

Figure 3:
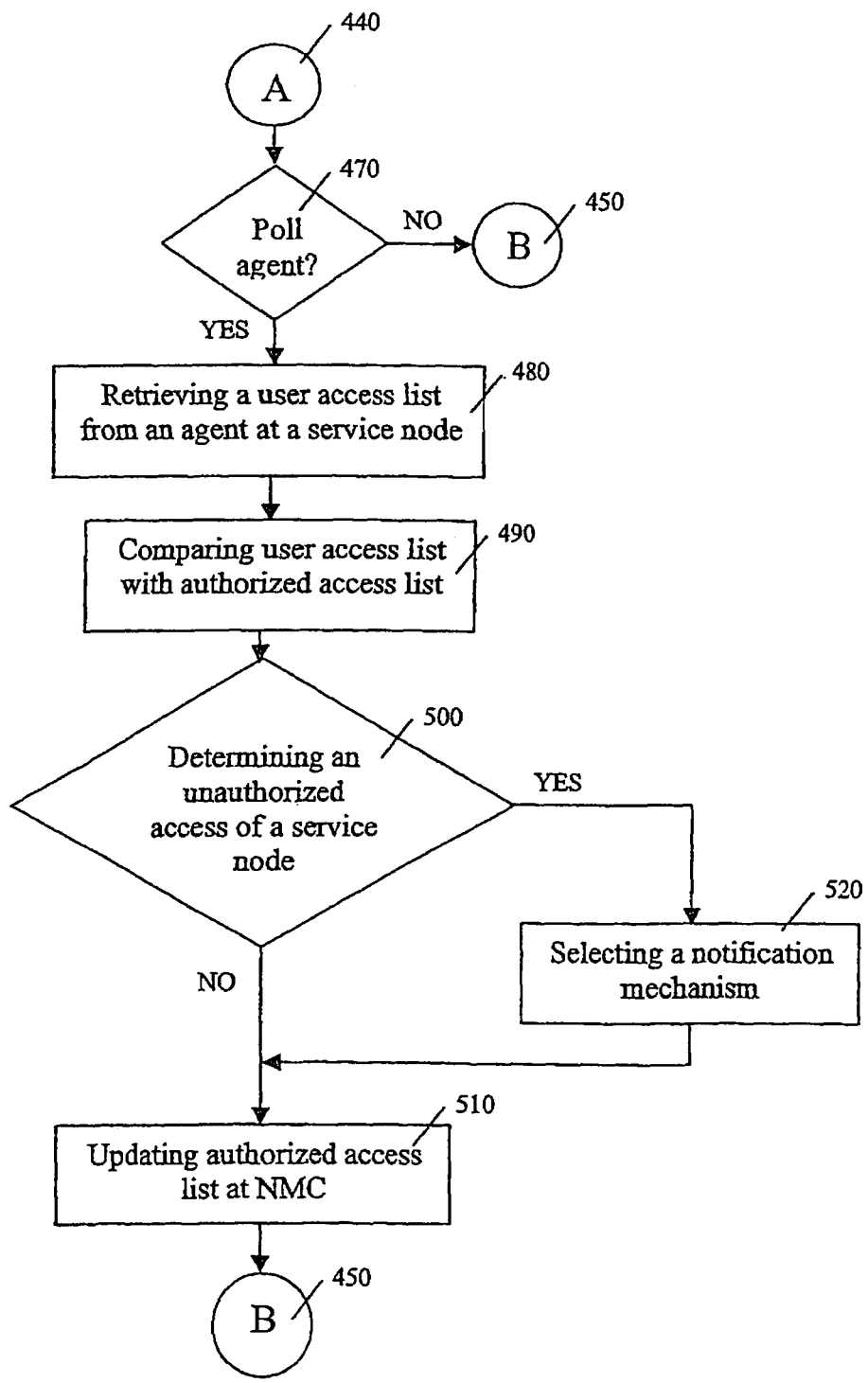
FIG. 3 is a subsidiary flowchart of FIG. 2 detailing the steps for identifying unauthorized accesses in a data network in accordance with the present invention.

FIG. 3 is a flowchart detailing a subsidiary process for identifying unauthorized accesses in a data network in accordance with the present invention. The process uses connector A 440 to begin with by step 470. In step 470, it is determined whether the NMC should poll the agent at a specific service node, i.e., retrieve user access information. This determination might be based on whether the information stored in the service node is critical to the integrity of the data network. If it is determined that the agent for a specific service node is not to be polled, the process ends by using connector B 450 to return to step 460, as explained with reference to FIG. 2. Otherwise, the agent of the selected service node is polled. In step 480, the NMC retrieves a user access list from the agent at the service node. Next, step 490 the NMC compares the user access list with an authorized access list associated with the service node. Based on the comparison in step 490, step 500 determines whether an unauthorized access of a service node was identified. If step 500 does not identify an unauthorized access, then step 510 is executed. If an unauthorized access was identified in step 500, then step 520 selects a suitable notification mechanism. Finally, in step 520, the authorized access list stored in the NMC is updated with any access information sent by the agent of the service node. The process is then ended by using connector B 450 to return to step 460 of FIG. 2.

In FIG. 3, the frequency of the polling step 470 by the NMC is adjustable by the NOC. Increased frequency results in shorter average delays in the notification of problems at the cost of increased network traffic. The NMC is also configured with a list of authorized users for each node. Since in most cases, a common authorization list exists for a group of nodes, this configuration is simplified by the NMC maintaining a range of nodes for a given authorization list. For each unique authorization list, the NMC simply determines whether a user node is within the range of nodes authorized to access the service node.

Figure 4:
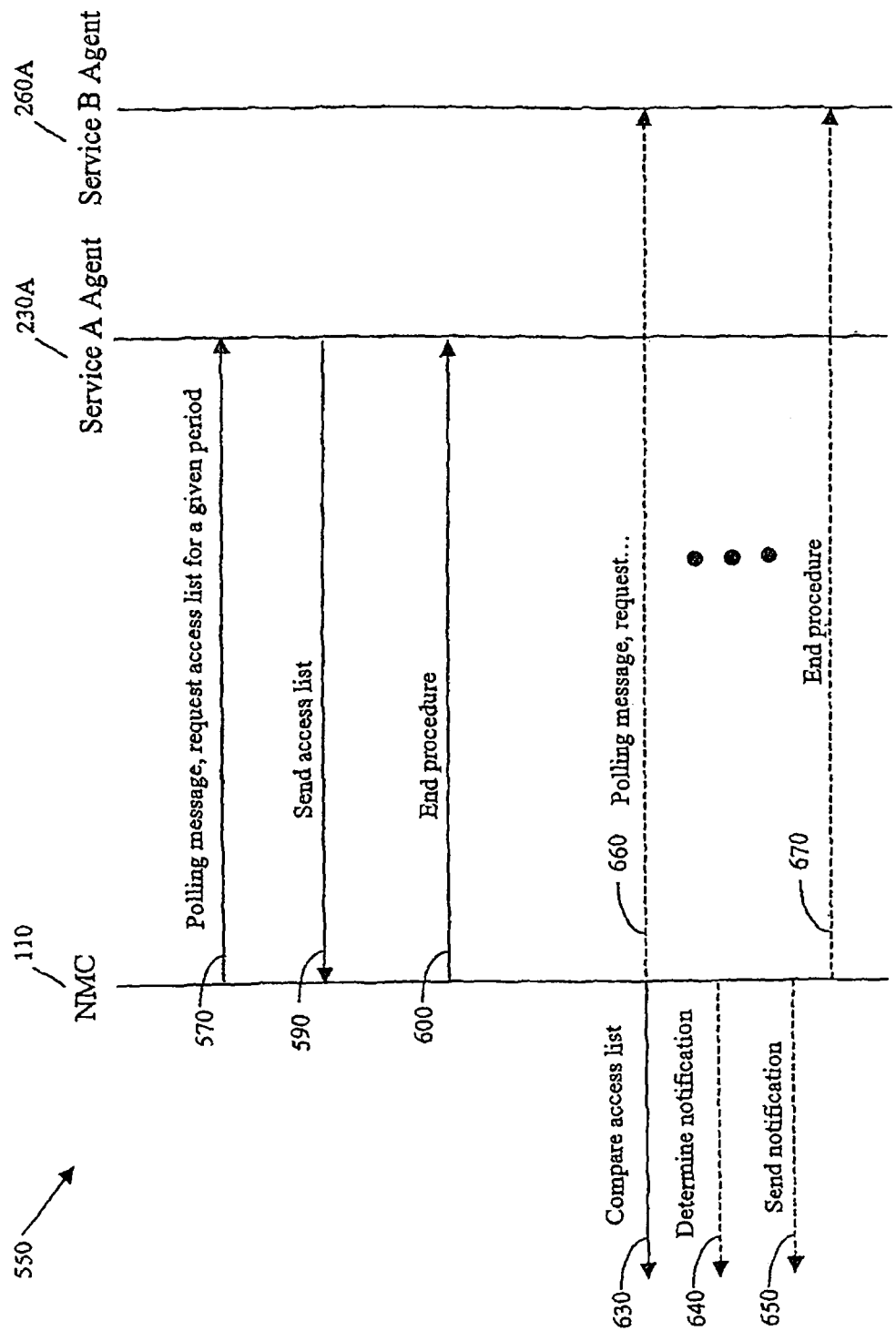
FIG. 4 is a timing diagram detailing a sequence of events between the network manager and user agents located at various nodes in a data network in accordance with the present invention.

FIG. 4 illustrates a timing diagram detailing a sequence of events between the NMC 110 and the service agents, 230A and 260A, respectively. In FIG. 4, the dashed lines indicate that the events are conditional for reasons explained earlier in exampled from FIGS. 1, 2, and 3. According to the timing diagram, the NMC 110 and the service A agent 230A communicate in a series of events, 570, 590, and 600. Basically, these events enable the NMC 110 to request and retrieve the access list from the service A agent 230A. The internal NMC events which follow, 630, 640, 650, are performed within the NMC 110. The event 630 enables the NMC 110 to compare the access list with an authorized user list stored in the NMC database. Based on the comparison, unauthorized users are identified. The subsequent events 640 and 650 are conditional on whether an unauthorized user has been identified. If an unauthorized user is identified, the NMC 110 selects a suitable notification mechanism in event 640 and then sends the notification in event 650. The events 660 through to 670 are executed concomitantly with the internal NMC events 630, 640, 650. The events 660 through 670 represent the request and retrieval of an access list from the service B agent 260A by the NMC 110. The timing diagram should illustrate that while the NMC 110 is executing the notification event 650 with respect to an unauthorized user, the NMC 110 may also be retrieving data from the service B agent 260A. The multi-tasking ability of the NMC 110 is advantageous in that the identification and the notification of unauthorized users for various services nodes may be performed simultaneously, not just one service node for a given time interval.

While It would be preferable if an available or installed agent sent the network service access list through SNMP, other message protocols may be utilized for the purposes of the present invention. The NMC could also retrieve the authorization access list by querying a Lightweight Directory Access Protocol (LDAP) server, for example, or by some other method. In networks where a standard SNMP agent on a node is utilized, the present invention would not require any modifications to the node apart from some software configuration settings on the agent which can be done automatically from the NMC.

Furthermore, the present invention is not limited to use in a "trusted" data network. The present invention is also applicable to external data networks where the identification of unauthorized accesses is required. Both the system and method of the present invention are also applicable to other data network services. For example, in a network running an ORACLE™ database, created by Oracle, where sensitive data is managed, there may be a need to ensure that only authorized users access the service over the data network.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A data network management system for identifying unauthorized access to a data network service, provided at a service node in a data network, by a user node in said data network, said service node having an agent and having means for maintaining a user access list, said user access list having at least one data network address corresponding to at least one user node in said data network, said system comprising:
   a data communication means for periodically polling said agent at said service node and for retrieving a user access list from said agent, said user access list specifying which users have accessed said service node;
   a database for maintaining an authorized access list for said service node, said authorized access list specifying which users are authorized to access said service node; and
   a data processing means for detecting unauthorized access to said service node by comparing said user access list to said authorized access list and for updating said authorized access list based on the user access list retrieved from said agent.

2. The data network management system as defined in claim 1, wherein said agent is a Simple Network Management Protocol agent.

3. The data network management system as defined in claim 1, wherein said data communication means is a Simple Network Management Protocol communication means.

4. The data network management system as defined in claim 1, further including means for installing said agent at said service node, said agent having means to communicate with said data communication means.

5. The data network as defined in claim 1, wherein said authorized access list is a common authorized user access list that includes a range of user nodes for comparing to said user access list to determine if said user access list is a subset of said common authorization access list.

6. The data network management system of claim 1 wherein said user access list identifies a plurality of accesses to said service node.

7. A method for identifying unauthorized access to a data network service, provided at a service node in a data network, by a user node in said data network, said service node having an agent and having means for maintaining a user access list, said user access list having at least one data network address corresponding to at least one user node in said data network, said method comprising:
   a) periodically polling an agent and retrieving said user access list, for a given period of time, from said service node in said data network;
   b) comparing said user access list to an authorized access list;
   c) determining if an access to said service node was unauthorized based on comparing said user access list to the authorized access list; and
   d) if said access was not authorized, initiating a notification process;
wherein said user access list specifies which users have accessed said service node.

8. The method as defined in claim 7, further including updating said authorized access list based on said user access list retrieved from said service node.

9. The method as defined in claim 7, further including installing said agent at said user node, prior to periodically polling and retrieving said user access list.

10. The method as defined in claim 7, further including selecting said service node for identification based on a predetermined criteria, prior to retrieving said user access list.

11. The method as defined in claim 7, wherein said notification process comprises notifying a Network Operations Console.

12. The method as defined in claim 7, wherein a) through c) are repeated, and wherein said user node is selected from one of a plurality of user nodes in said data network.

13. The method as defined in claim 7, wherein a) through d) are repeated, and wherein said user node is selected from one of a plurality of user nodes in said data network.

14. The method as defined in claim 7, wherein said agent is a Simple Network Management Protocol agent.

15. A non-transitory computer-readable medium for identifying unauthorized access to a data network service, provided at a service node in a data network, by a user node in said data network, said service node having an agent and having means for maintaining a user access list, said user access list having at least one data network address corresponding to at least one user node in said data network, and said medium having stored thereon, computer-readable and computer-executable instructions which, when executed by a processor, cause said processor to perform steps comprising:
   a) periodically polling an agent and retrieving said user access list, for a given period of time, from said service node in a data network;
   b) comparing said user access list to an authorized access list;
   c) determining if an access to said data network service was authorized based on said comparison step b);
   d) if determined that said access was unauthorized, initiating a notification process;
   wherein said user access list specifies which users have accessed said service node.

16. The non-transitory computer-readable medium as defined in claim 15, further containing computer-readable and computer-executable instructions which perform a step of updating said authorized access list based on user access information.

17. The non-transitory computer-readable medium as defined in claim 15, further containing computer-readable and computer-executable instructions which perform a step of installing said agent at said user node, prior to retrieving said user access list in step a).

18. The non-transitory computer-readable medium as defined in claim 15, further containing computer-readable and computer-executable instructions wherein said steps a) through c) are repeated, and wherein said user node is selected from one of a plurality of user nodes in said data network.

19. The non-transitory computer-readable medium as defined in claim 15, wherein said agent is a Simple Network Management Protocol agent.

20. A computer for use in a data network for identifying unauthorized access to a data network service, provided at a service node in a data network, by a user node in said data network, said service node having an agent and having means for maintaining a user access list, said user access list having at least one data network address corresponding to at least one user node in said data network; said computer comprising:
   means for storing an authorized access list for said service node, said authorized access list specifying which users are authorized to access said service node;
   a central processing unit;
   data communication means for periodically polling said agent at said service node and retrieving a user access list from said agent said user access list specifying which users have accessed said service node; and
   data processing means for comparing said retrieved user access list to said authorized access list and for updating said authorized access list based on the user access list retrieved from said agent.

* * * * *